United States Patent
Imazu

(10) Patent No.: US 7,314,426 B2
(45) Date of Patent: Jan. 1, 2008

(54) HYBRID VEHICLE AND CONTROL METHOD THEREOF

(75) Inventor: Tomoya Imazu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 178 days.

(21) Appl. No.: 11/339,444

(22) Filed: Jan. 26, 2006

(65) Prior Publication Data

US 2006/0175102 A1 Aug. 10, 2006

(30) Foreign Application Priority Data

Feb. 3, 2005 (JP) ............... 2005-027400

(51) Int. Cl.
*B60W 10/02* (2006.01)
*B60W 10/04* (2006.01)
*H02P 15/00* (2006.01)
*H02P 17/00* (2006.01)

(52) U.S. Cl. .................. 477/6; 477/8; 477/15; 903/945

(58) Field of Classification Search ............ 477/6, 477/8, 15; 903/912, 945, 947
See application file for complete search history.

(56) References Cited

U.S. PATENT DOCUMENTS 6,364,807 B1 4/2002 Koneda et al.
7,108,087 B2 * 9/2006 Imai .................. 180/65.2
2007/0066443 A1 * 3/2007 Matsudaira et al. ........ 477/115

FOREIGN PATENT DOCUMENTS

| EP | 1 375 963 A2 | 1/2004 |
| EP | 1 459 924 A2 | 9/2004 |
| EP | 1 502 791 A2 | 2/2005 |
| JP | 2003-32808 A | 1/2003 |

* cited by examiner

*Primary Examiner*—Tisha Lewis
(74) *Attorney, Agent, or Firm*—Foley & Lardner LLP

(57) ABSTRACT

A controller (20), when switching from a travel mode in which a vehicle travels with an engine clutch (EC) disengaged to a travel mode in which the vehicle travels with the engine clutch (EC) engaged, performs a preparatory speed change to reduce a rotation speed differential in the engine clutch (EC), engages the engine clutch (EC) when the rotation speed differential in the engine clutch (EC) is reduced, and then performs a completion speed change until a speed ratio required in the post-switching travel mode is obtained. The upper limit value of a shifting speed during at least one of the preparatory speed change and the completion speed change is set to a different value to the upper limit value of the shifting speed when a speed change is performed during traveling in the same travel mode.

14 Claims, 5 Drawing Sheets

HYBRID VEHICLE AND CONTROL METHOD THEREOF

TECHNICAL FIELD OF THE INVENTION

This invention relates to a hybrid vehicle having an engine and a motor as a driving force source and a control method thereof.

BACKGROUND OF THE INVENTION

JP2003-32808A, published by the Japan Patent Office, discloses a mechanism (to be referred to as E-iVT hereafter) for performing continuous speed variation by connecting an engine, first and second motor generators, an output gear which outputs a driving force to a drive wheel, and a brake to five rotational elements of a two freedom-degree differential mechanism.

In a travel mode in which the vehicle travels with the brake disengaged, continuous speed variation can be realized by controlling the rotation speeds of the engine and the first and second motor generators, and in a travel mode in which the vehicle travels with the brake engaged, a fixed speed ratio, in which the rotation speed of the engine and the rotation speed of the output gear are fixed, is realized.

A clutch is interposed between the engine and differential mechanism, and by switching the engagement state of the clutch, it is possible to switch between a travel mode in which the vehicle travels on the motive power of the first and second motors alone, regardless of the motive power of the engine, and a travel mode in which the vehicle can travel using the motive power of the engine in addition to the motive power of the first and second motors.

SUMMARY OF THE INVENTION

In a vehicle having the E-iVT described above, speed change control is often performed in the fashion of conventional belt CVT speed change control and the shifting speed (the speed ratio changing speed) is set in consideration of the responsiveness of the engine and motor, the possible input/output power of the battery, and so on. Particularly during travel mode switching, the shifting speed is set to suppress driving force variation.

However, when the shifting speed is set to suppress driving force variation during travel mode switching, the mode switching operation slows, and particularly when switching is performed to a travel mode in which a large driving force is generated, the delay in mode switching leads to a delay in driving force generation. As a result, it may be impossible to obtain the required driving force, causing the driver to feel a sense of discomfort.

It is therefore an object of this invention to set a shifting speed during travel mode switching in a vehicle having an E-iVT appropriately in order to lessen the sense of discomfort felt by a driver.

In order to achieve the above-mentioned object, this invention provides a hybrid vehicle including: a two freedom-degree differential mechanism having at least first through fourth rotational elements disposed on an alignment chart; an engine, an output gear which outputs a driving force to a drive wheel, a first motor, and a second motor, which are connected to the first through fourth rotational elements, respectively; an engine clutch interposed between the first rotational element and the engine; and a controller which controls a rotation speed of the engine, the first motor, and the second motor and an engagement of the engine clutch. The controller functions to: modify a speed ratio, which is a ratio between the rotation speed of the engine and the rotation speed of the output gear, to be continuously variable by controlling the rotation speed of at least one of the first motor, the second motor, and the engine; and when switching from a travel mode in which the vehicle travels with the engine clutch disengaged to a travel mode in which the vehicle travels with the engine clutch engaged, perform a preparatory speed change to reduce a rotation speed differential in the engine clutch, engage the engine clutch when the rotation speed differential in the engine clutch is reduced, and then perform a completion speed change until the speed ratio required in the post-switching travel mode is obtained, and an upper limit value of a shifting speed during at least one of the preparatory speed change and the completion speed change is set to a different value to the upper limit value of the shifting speed when a speed change is performed during traveling in the same travel mode.

According to an aspect of this invention, this invention provides a hybrid vehicle comprising: a two freedom-degree differential mechanism having at least first through fifth rotational elements disposed on an alignment chart; an engine, an output gear which outputs a driving force to a drive wheel, a first motor, a second motor, and a fixed speed ratio brake, which are connected to the first through fifth rotational elements, respectively; and a controller which controls a rotation speed of the engine, the first motor, and the second motor and an engagement of the fixed speed ratio brake. The controller functions to: modify a speed ratio, which is a ratio between the rotation speed of the engine and the rotation speed of the output gear, to be continuously variable by disengaging the fixed speed ratio brake and controlling the rotation speed of at least one of the first motor, the second motor, and the engine; fix the speed ratio by engaging the fixed speed ratio brake; and when switching from a travel mode in which the vehicle travels with the fixed speed ratio brake disengaged to a travel mode in which the vehicle travels with the fixed speed ratio brake engaged, perform a preparatory speed change to reduce a rotation speed differential in the fixed speed ratio brake, engage the fixed speed ratio brake when the rotation speed differential in the fixed speed ratio brake is reduced, and then perform a completion speed change until the speed ratio required in the post-switching travel mode is obtained, and an upper limit value of a shifting speed during at least one of the preparatory speed change and the completion speed change is set to a different value to the upper limit value of the shifting speed when a speed change is performed during traveling in the same travel mode.

According to another aspect of this invention, this invention provides control methods for above-mentioned hybrid vehicles.

The details as well as other features and advantages of this invention are set forth in the remainder of the specification and are shown in the accompanying drawings.

PREFERRED EMBODIMENT OF THE INVENTION

Figure 1:
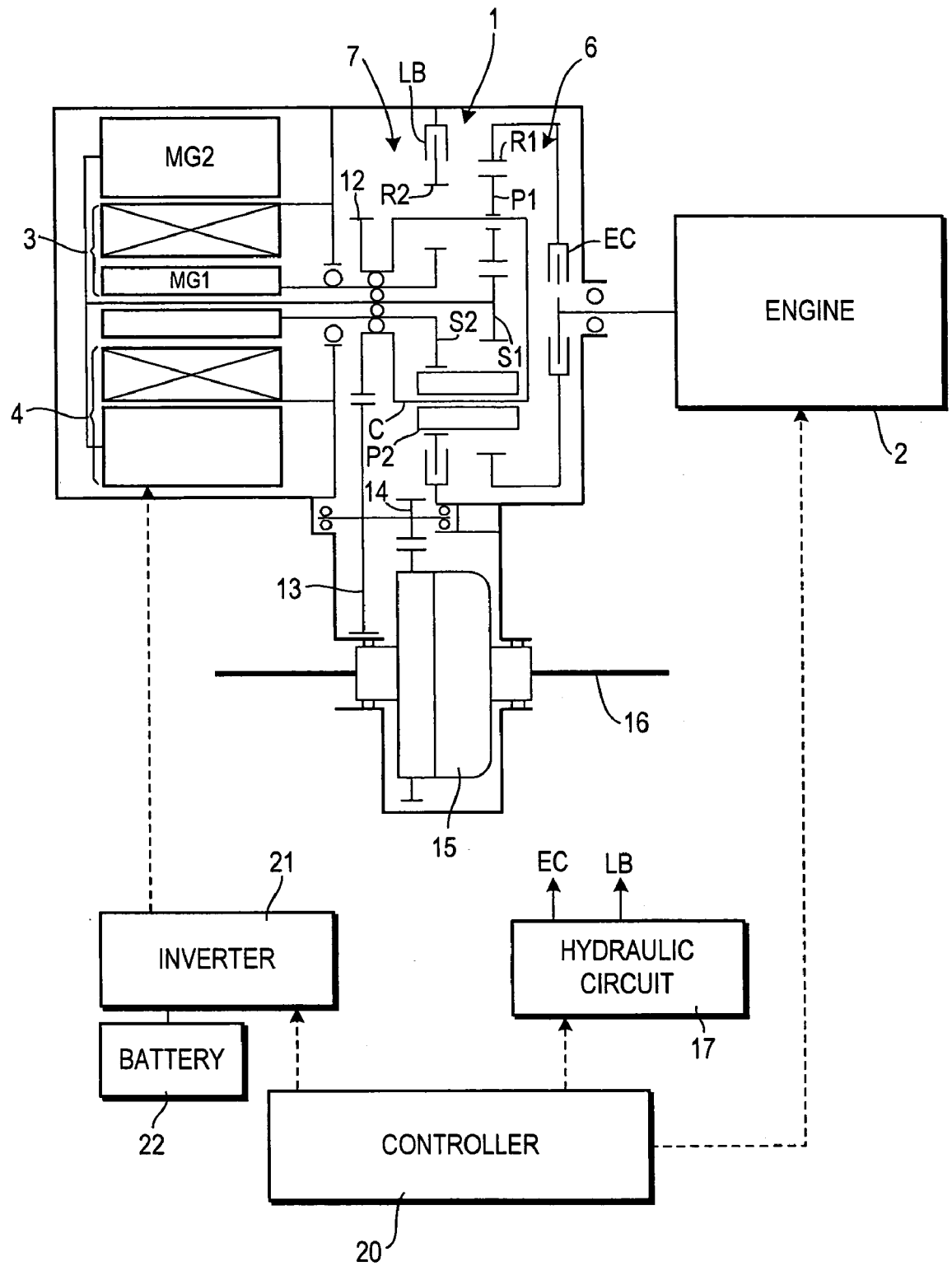
FIG. 1 is a block diagram of a hybrid vehicle according to this invention.

FIG. 1 of the drawings shows the schematic constitution of a hybrid vehicle according to this invention. The hybrid vehicle includes a differential mechanism 1, and the motive power of an engine 2, a first motor generator 3, and a second motor generator 4 is transmitted to drive wheels, not shown in the drawing, via the differential mechanism 1. The first motor generator 3 is disposed on the inside of the second motor generator 4, and the first motor generator 3 and second motor generator 4 are coaxial, multilayer motors which share a stator.

The differential mechanism 1 is a ravigneaux planetary gear mechanism combining a first planetary gear train 6 and a second planetary gear train 7. A pinion P1 of the first planetary gear train 6 and a pinion P2 of the second planetary gear train 7 are meshed together and supported by a shared carrier C (second rotational element).

The engine 2 is connected to a ring gear R1 (first rotational element) of the first planetary gear train 6 via an engine clutch EC constituted by a hydraulic, multiple disk clutch. The first motor generator 3 (to be exact, a rotor of the first motor generator 3) is connected to a sun gear S2 (third rotational element) of the second planetary gear train 7. The second motor generator 4 (to be exact, a rotor of the second motor generator 4) is connected to a sun gear S1 (fourth rotational element) of the first planetary gear train 6.

An output gear 12 is connected to the shared carrier C, and motive power transmitted to the output gear 12 is transmitted to the drive wheels, not shown in the drawing, via gears 13, 14, a differential gear 15, and a drive shaft 16.

A low brake LB is provided on a ring gear R2 (fifth rotational element) of the second planetary gear train 7. The low brake LB is constituted by a hydraulic, multiple disk clutch which, when engaged, inhibits rotation of the ring gear R2 such that the speed ratio (the ratio between the rotation speed of the engine 2 and the rotation speed of the output gear 12) of the differential mechanism 1 is fixed at a predetermined low speed ratio.

The supply of oil pressure to the engine clutch EC and low brake LB is controlled by a hydraulic circuit 17, and the engagement state of the engine clutch EC and low brake LB is controlled by a controller 20 via the hydraulic circuit 17.

The rotation speed and torque of the engine 2, first motor generator 3, and second motor generator 4 is controlled by the controller 20. By controlling the rotation speed of these power sources, the speed ratio of the differential mechanism 1 can be controlled to be continuously variable when the low brake LB is disengaged. It should be noted that control of the rotation speed and torque of the first motor generator 3 and second motor generator 4 is performed via an inverter 21, and a battery 22 is connected to the inverter 22.

Figure 2:
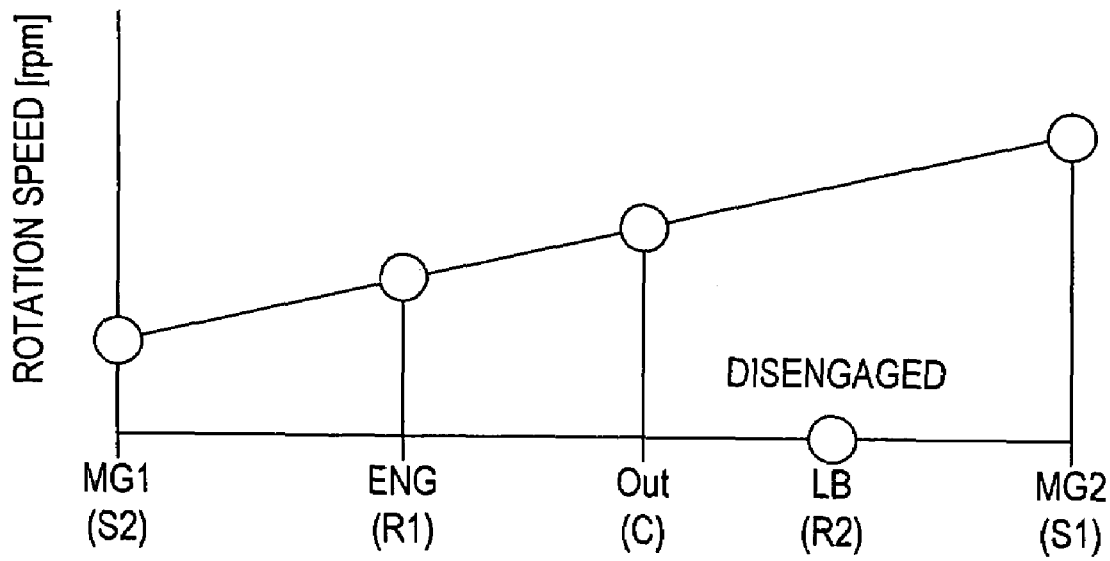
FIG. 2 is an alignment chart of a differential mechanism, showing a state in which a low brake is disengaged.

FIG. 2 is an alignment chart of the differential mechanism 1. The ordinate of the alignment chart shows the rotation speed of each rotational element, and the abscissa shows the speed ratio relationships between each rotational element. When the ring gear R1 to which the engine 2 is connected, the sun gear S2 to which the first motor generator 3 is connected, the sun gear S1 to which the second motor generator 4 is connected, the carrier C to which the output gear 12 is connected, and the ring gear R2 provided with the low brake LB are illustrated on the alignment chart, these rotational elements are arrayed in mutual alignment.

Figure 3:
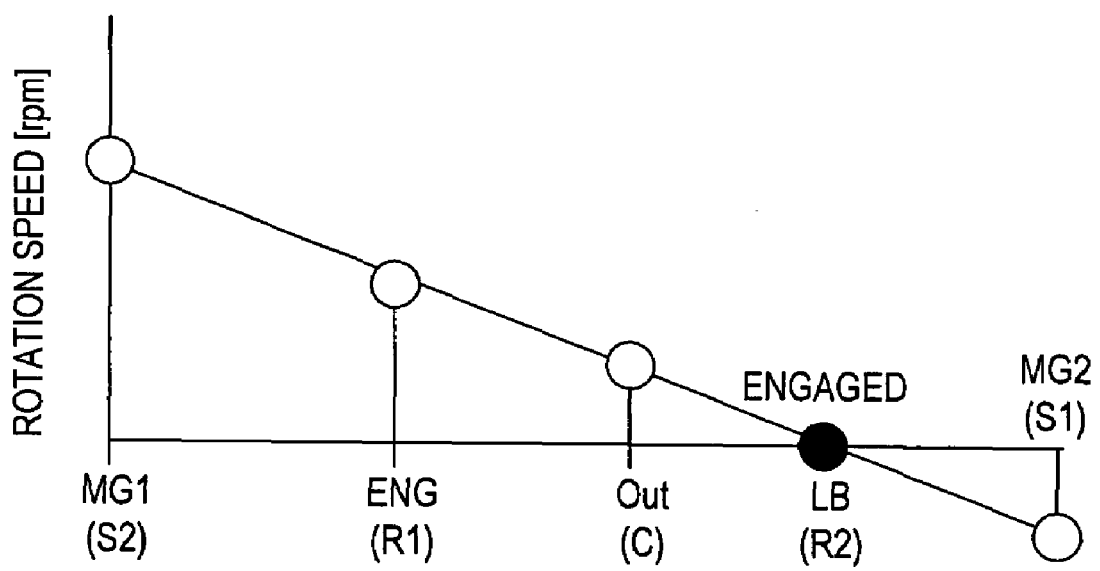
FIG. 3 is an alignment chart of the differential mechanism, showing a state in which the low brake is engaged.

When the low brake LB is disengaged and the rotation speeds of any two rotational elements are determined, the rotation speeds of the other rotational elements are determined. Hence, the freedom degree of the differential mechanism 1 is two, and the speed ratio of the differential mechanism 1 can be set to be continuously variable. FIG. 3 shows an alignment chart in which the low brake LB is engaged, and in this state, the speed ratio of the differential mechanism 1 is fixed on the low side.

Signals indicating the operating conditions of the vehicle, such as the rotation speed of the engine 2, first motor generator 3, and second motor generator 4, an accelerator pedal depression amount, a state of charge of the battery 22, and the vehicle speed, are input into the controller 20 from sensors not shown in the drawing, and in accordance with the vehicle operating conditions, the controller 20 switches the travel mode and controls the torque and rotation speed of the engine 2, first motor generator 3, and second motor generator 4 such that a target driving force, which is set in accordance with the accelerator pedal depression amount, vehicle speed, and so on, is realized.

Figure 4:
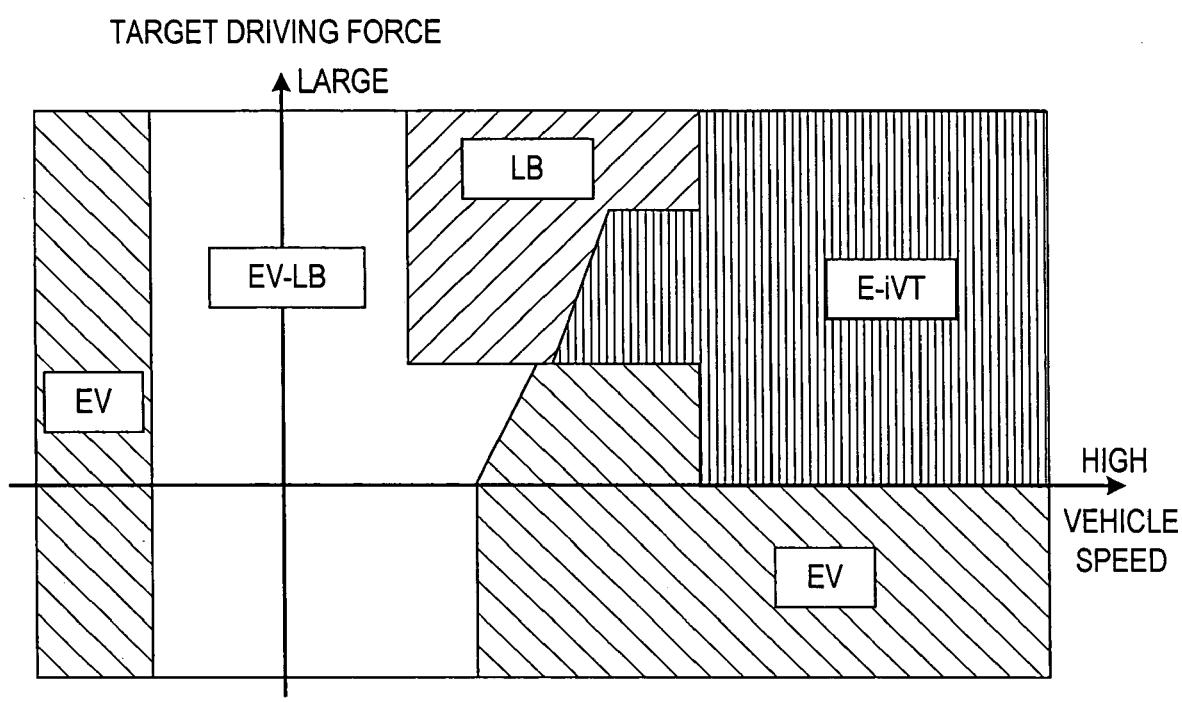
FIG. 4 is a travel mode switching map.

The travel mode is determined on the basis of the vehicle speed and target driving force by referring to a travel mode switching map such as that shown in FIG. 4.

To describe each travel mode, an EV-LB mode is a mode in which the low brake LB is engaged such that the speed ratio of the differential mechanism 1 is fixed on the low side, and the engine clutch EC is disengaged such that the vehicle travels on the motive power of the first motor generator 3 and second motor generator 4 alone. This mode is used principally during start-up and acceleration. An LB mode is a mode in which the low brake LB is engaged such that the speed ratio of the differential mechanism 1 is fixed on the low side, and the engine clutch EC is engaged such that the vehicle travels on the motive power of the engine 2, first motor generator 3, and second motor generator 4. This mode is used mainly when a large driving force is required at low vehicle speeds.

An EV mode is a mode in which both the low brake LB and the engine clutch EC are disengaged such that the vehicle travels on the motive power of the first motor generator 3 and second motor generator 4 alone. This mode is used when reversing or during low-load, medium-speed traveling, and also when the first motor generator 3 and second motor generator 4 generate power using the motive power of the engine 2. An E-iVT mode is a mode in which the low brake LB is disengaged and the engine clutch EC is engaged such that the vehicle travels on the motive power of the engine 2, first motor generator 3, and second motor generator 4. This mode is used principally during high-speed traveling.

When switching from a travel mode in which the vehicle travels with the low brake LB disengaged (E-iVT mode, EV mode) to a travel mode in which the vehicle travels with the low brake LB engaged (LB mode, EV-LB mode), first a preparatory speed change is performed to control the rotation speed of the engine 2, first motor generator 3, and second motor generator 4 such that the rotation speed of the ring gear R2 provided with the low brake LB approaches zero, and when the rotation speed of the ring gear R2 approaches zero, the low brake LB is engaged. Thereafter, a completion speed change is performed until the speed ratio required in the post-switching travel mode is obtained.

Conversely, when switching from a travel mode in which the vehicle travels with the low brake LB engaged to a travel mode in which the vehicle travels with the low brake LB disengaged, the low brake LB is disengaged, and then a completion speed change is performed until the speed ratio required in the post-switching travel mode is obtained.

Similar speed change control is performed when switching from a travel mode in which the vehicle travels with the engine clutch EC disengaged (EV mode, EV-LB mode) to a travel mode in which the vehicle travels with the engine clutch EC engaged (LB mode, E-iVT mode), and vice versa.

Here, when the shifting speed (the speed ratio changing speed, likewise hereafter) during travel mode switching is set in the same manner as the shifting speed when a speed change is performed within the same travel mode, the following problem arises. That is, with the shifting speed when a speed change is performed within the same travel mode, importance is attached to the driving feeling, and therefore an upper shifting speed limit is set in consideration of the responsiveness of the engine 2, first motor generator 3, and second motor generator 4 to prevent variation in the driving force. However, when the same setting method is employed during travel mode switching, driving force variation can still be suppressed, but the travel mode switching operation slows such that the desired driving force cannot be obtained. As a result, the driver may feel a sense of discomfort, and a delay may occur in charge/discharge power control.

Hence, in the hybrid vehicle according to this invention, shifting speed control is performed in the manner described below.

Figure 5:
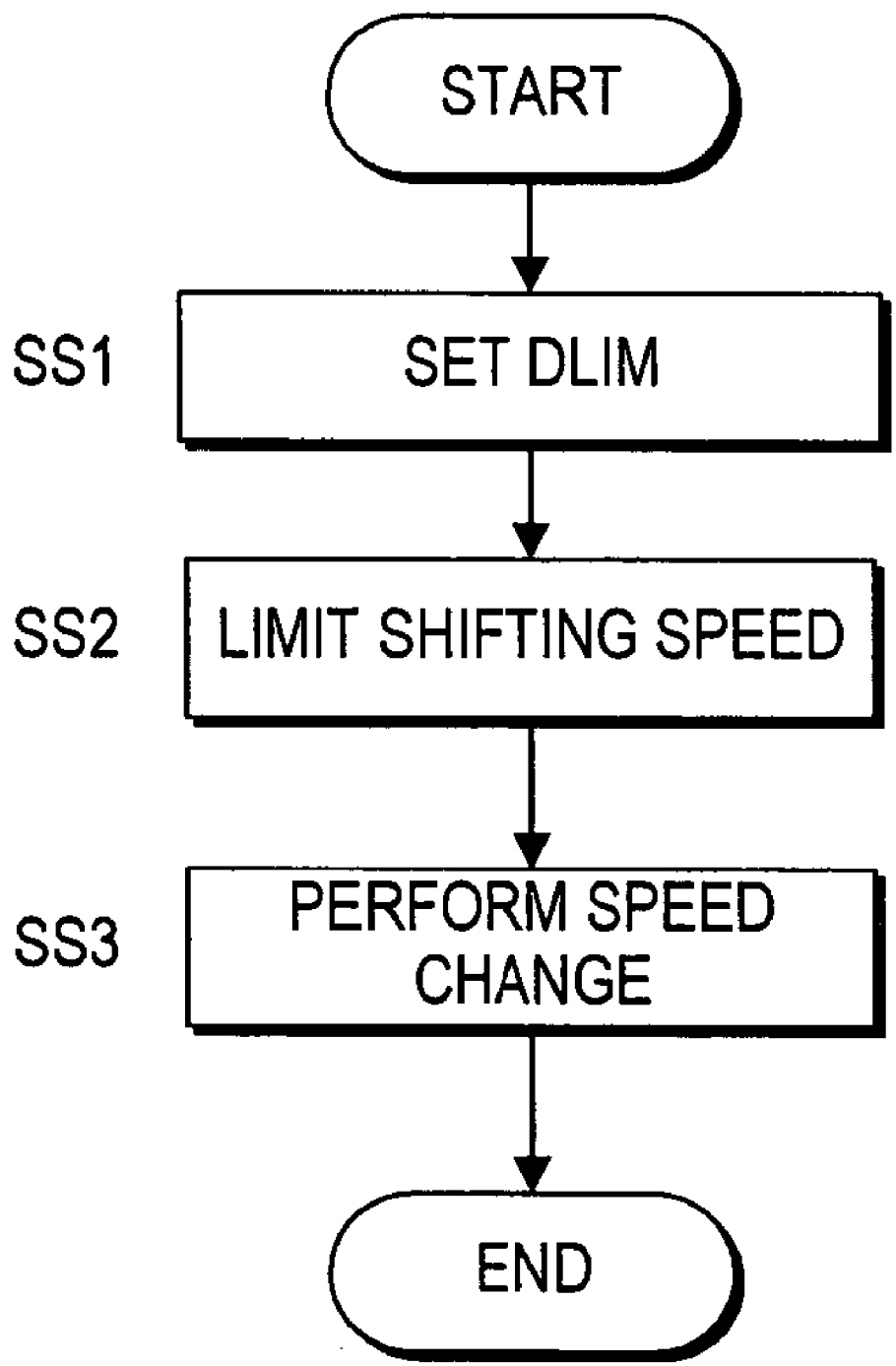
FIG. 5 is a flowchart illustrating the content of shifting speed control.

FIG. 5 is a flowchart showing the content of shifting speed control performed by the controller 20.

To describe the shifting speed control with reference to this flowchart, first, in a step SS1, an upper limit value DLIM of the shifting speed is set according to whether or not travel mode switching is underway. The upper shifting speed limit DLIM is set according to a flowchart shown in FIG. 6, and will be described below.

In a step SS2, the shifting speed of the differential mechanism 1, which is set in accordance with the difference between a target speed ratio set in accordance with the vehicle operating conditions and travel mode and the current speed ratio, is limited by the upper shifting speed limit DLIM.

In a step SS3, the rotation speed of the engine 2, first motor generator 3, and second motor generator 4 is controlled such that a speed change is performed at the limited shifting speed.

Figure 6:
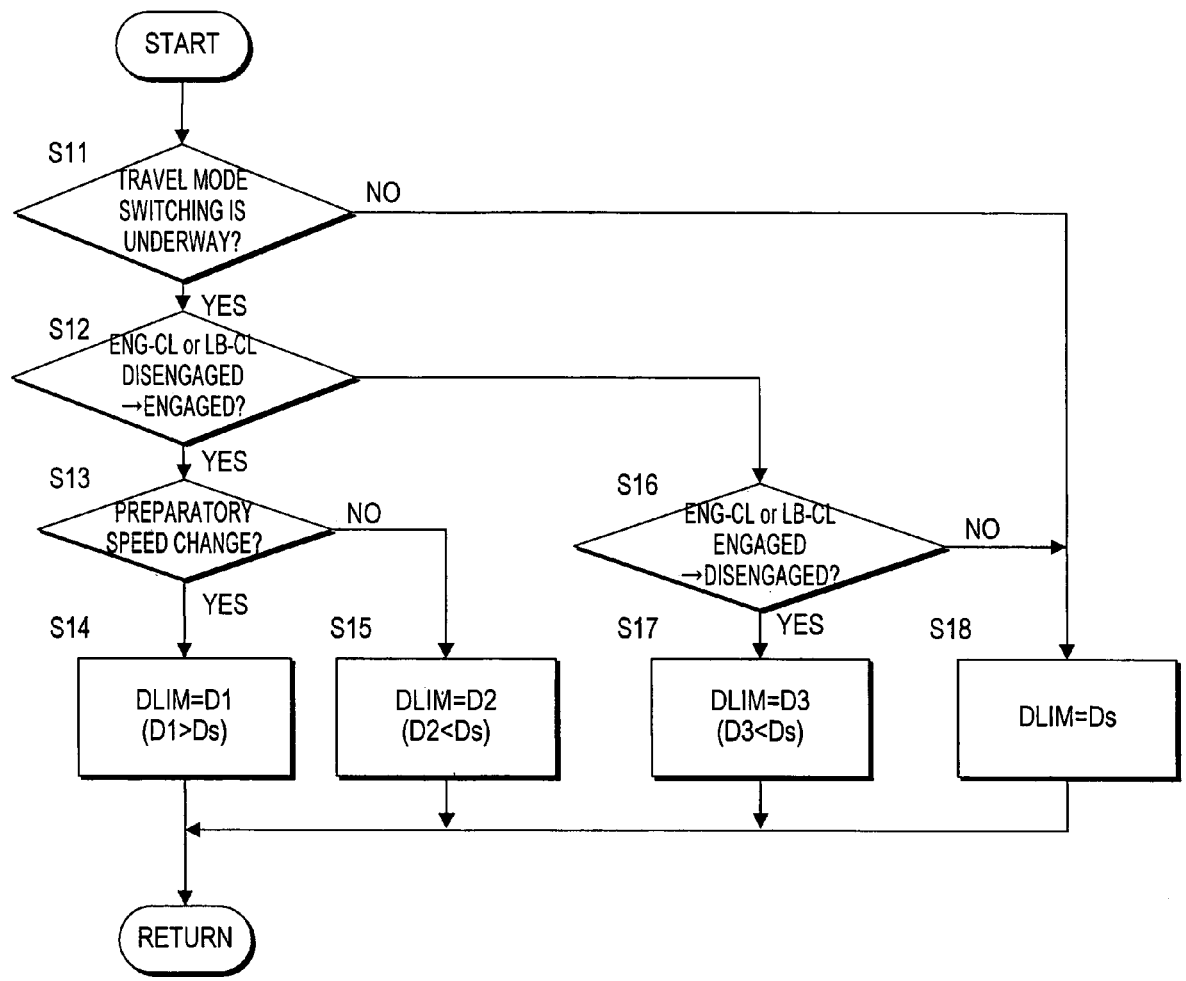
FIG. 6 is a flowchart for setting an upper shifting speed limit DLIM.

FIG. 6 is a flowchart for setting the upper shifting speed limit DLIM.

First, in a step S11, a determination is made as to whether or not travel mode switching is underway, and when it is determined that switching is underway, the routine advances to a step S12. When it is determined that switching is not underway, the routine advances to a step S18, where the upper shifting speed limit DLIM is set to a standard upper shifting speed limit Ds. The standard upper shifting speed limit Ds is a value set in consideration of the responsiveness of the engine 2, first motor generator 3, and second motor generator 4 when a speed change is performed under fixed driving force conditions within the same travel mode.

In a step S12, a determination is made as to whether or not the travel mode is being switched from a travel mode in which the vehicle travels with the engine clutch EC disengaged to a travel mode in which the vehicle travels with the engine clutch EC engaged, or from a travel mode in which the vehicle travels with the low brake LB disengaged to a travel mode in which the vehicle travels with the low brake LB engaged. If either of these switching operations is underway, the routine advances to a step S13, and if not, the routine advances to a step S16.

In the step S13, a determination is made as to whether or not a preparatory speed change is underway to bring the rotation speed differential in the engine clutch EC or low brake LB to the vicinity of zero prior to the engagement of either of these elements. If it is determined that a preparatory speed change is underway, the routine advances to a step S14, and if not, the routine advances to a step S15.

In the step S14, the upper shifting speed limit DLIM is set to a predetermined value D1. The predetermined value D1 is greater than the standard upper shifting speed limit Ds.

In the step S15, the upper shifting speed limit DLIM is set to a predetermined value D2. The predetermined value D2 is smaller than the standard upper shifting speed limit Ds.

Meanwhile, when the routine advances from the step S12 to the step S16, a determination is made as to whether or not the travel mode is being switched from a travel mode in which the vehicle travels with the engine clutch EC engaged to a travel mode in which the vehicle travels with the engine clutch EC disengaged, or from a travel mode in which the vehicle travels with the low brake LB engaged to a travel mode in which the vehicle travels with the low brake LB disengaged. If either of these switching operations is underway, the routine advances to a step S17, and if not, the routine advances to the step S18, where the upper shifting speed limit DLIM is set to the standard upper shifting speed limit Ds.

In the step S17, the upper shifting speed limit DLIM is set to a predetermined value D3. The predetermined value D3 is smaller than the standard upper shifting speed limit Ds.

Next, actions generated when the above shifting speed control is performed will be described.

In the hybrid vehicle according to this invention, when the travel mode is switched from a travel mode (EV mode, EV-LB mode) in which the vehicle travels with the engine clutch EC disengaged to a travel mode (LB mode, E-iVT mode) in which the vehicle travels with the engine clutch EC engaged, first a preparatory speed change is performed to control the rotation speed of the first motor generator 3 and second motor generator 4 in order to reduce the rotation speed differential in the engine clutch EC, or in other words the rotation speed difference between the engine 2 and ring gear R1. When the rotation speed difference between the engine 2 and ring gear R1 approaches zero, the engine clutch EC is engaged, and a completion speed change is performed until the speed ratio required in the post-switching travel mode is obtained.

During the preparatory speed change, the upper limit of the shifting speed is set to the predetermined value D1, which is greater than the standard upper shifting speed limit Ds, and therefore the shifting speed increases. Conversely, during the completion speed change, the upper limit of the shifting speed is set to the predetermined value D2, which is smaller than the standard upper shifting speed limit Ds, and therefore the shifting speed decreases. The standard upper shifting speed limit Ds is the upper limit value of the shifting speed when a speed change is performed under fixed driving force conditions within the same travel mode, and is set in consideration of the responsiveness of the engine 2, first motor generator 3, and second motor generator 4.

By setting the shifting speed in this manner, the driving force may vary during the preparatory speed change performed until the engine clutch EC is engaged, but the time period until the engine clutch EC becomes engaged can be shortened. The engine clutch EC is engaged when a large driving force is generated using the motive power of the engine 2 or when power generation is performed by driving the first motor generator 3 or second motor generator 4 with the motive power of the engine 2, and therefore, by shortening the time period until the engine clutch EC becomes engaged, the sense of discomfort caused by a delay in the generation of the driving force and delays in the charge/discharge power control can be prevented.

During the completion speed change following engagement of the engine clutch EC, the shifting speed is suppressed such that the speed change is performed gently. As a result, the sense of discomfort caused when the rotation speed of each rotational element in the differential mechanism 1, or in other words the speed ratio, varies suddenly can be reduced. During the completion speed change, although the speed change is performed to ensure that the driving force does not vary, driving force variation may occur due to an inertia error. However, by suppressing the shifting speed during the completion speed change such that the speed change is performed gently, the sense of discomfort felt by the driver in response to such driving force variation can also be reduced.

Similar shifting speed control is performed when switching from a travel mode (EV mode, E-iVT mode) in which the vehicle travels with the low brake LB disengaged to a travel mode (LB mode, EV-LB mode) in which the vehicle travels with the low brake LB engaged, and therefore delays in the travel mode switching operation do not occur. Hence, the resultant sense of discomfort caused by a delay in driving force generation, as well as delays in the charge/discharge power control, can be prevented.

Furthermore, in the hybrid vehicle according to this invention, when the travel mode is switched from a travel mode in which the vehicle travels with the engine clutch EC (or low brake LB) engaged to a travel mode in which the vehicle travels with the engine clutch EC (or low brake LB) disengaged, the completion speed change is performed with the upper shifting speed limit set to a smaller value than the normal shifting speed limit Ds. During the completion speed change, the speed change is performed until the speed ratio required after travel mode switching is obtained, and therefore the rotation speed of each rotational element varies. However, the sense of discomfort felt by the driver can be reduced by suppressing the shifting speed during the completion speed change.

The entire contents of Japanese Patent Application JP2005-27400 (filed Feb. 3, 2005) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A hybrid vehicle comprising:
a two freedom-degree differential mechanism having at least first through fourth rotational elements disposed on an alignment chart;
an engine, an output gear which outputs a driving force to a drive wheel, a first motor, and a second motor, which are connected to the first through fourth rotational elements, respectively;
an engine clutch interposed between the first rotational element and the engine; and
a controller which controls a rotation speed of the engine, the first motor, and the second motor and an engagement of the engine clutch,
wherein the controller functions to:
modify a speed ratio, which is a ratio between the rotation speed of the engine and the rotation speed of the output gear, to be continuously variable by controlling the rotation speed of at least one of the first motor, the second motor, and the engine; and
when switching from a travel mode in which the vehicle travels with the engine clutch disengaged to a travel mode in which the vehicle travels with the engine clutch engaged, perform a preparatory speed change to reduce a rotation speed differential in the engine clutch, engage the engine clutch when the rotation speed differential in the engine clutch is reduced, and then perform a completion speed change until the speed ratio required in the post-switching travel mode is obtained, and
an upper limit value of a shifting speed during at least one of the preparatory speed change and the completion speed change is set to a different value to the upper limit value of the shifting speed when a speed change is performed during traveling in the same travel mode.

2. The hybrid vehicle as defined in claim 1, wherein the upper limit value of the shifting speed during the preparatory speed change is set higher than the upper limit value of the shifting speed when a speed change is performed within the same travel mode.

3. The hybrid vehicle as defined in claim 1, wherein the upper limit value of the shifting speed during the completion speed change is set lower than the upper limit value of the shifting speed when a speed change is performed within the same travel mode.

4. The hybrid vehicle as defined in claim 1, wherein, when switching from the travel mode in which the vehicle travels with the engine clutch engaged to the travel mode in which the vehicle travels with the engine clutch disengaged, the controller further functions to disengage the engine clutch and set the upper limit value of the shifting speed lower than the upper limit value of the shifting speed when a speed change is performed within the same travel mode, and then perform a speed change until the speed ratio required in the post-switching travel mode is obtained.

5. The hybrid vehicle as defined in claim 1, wherein the upper limit value of the shifting speed when a speed change is performed within the same travel mode is the upper limit value of the shifting speed when a speed change is performed under a fixed driving force condition in the same travel mode.

6. A control method for a hybrid vehicle including a two freedom-degree differential mechanism having at least first through fourth rotational elements disposed on an alignment chart; an engine, an output gear which outputs a driving force to a drive wheel, a first motor, and a second motor, which are connected to the first through fourth rotational elements, respectively; and an engine clutch interposed between the first rotational element and the engine; the method comprising:
modifying a speed ratio, which is a ratio between the rotation speed of the engine and the rotation speed of the output gear, to be continuously variable by controlling the rotation speed of at least one of the first motor, the second motor, and the engine; and
when switching from a travel mode in which the vehicle travels with the engine clutch disengaged to a travel mode in which the vehicle travels with the engine clutch engaged, performing a preparatory speed change to reduce a rotation speed differential in the engine clutch, engaging the engine clutch when the rotation speed differential in the engine clutch is reduced, and then performing a completion speed change until the speed ratio required in the post-switching travel mode is obtained, wherein an upper limit value of a shifting speed during at least one of the preparatory speed change and the completion speed change is set to a different value to the upper limit value of the shifting speed when a speed change is performed during traveling in the same travel mode.

7. A hybrid vehicle comprising:

a two freedom-degree differential mechanism having at least first through fourth rotational elements disposed on an alignment chart;

an engine, an output gear which outputs a driving force to a drive wheel, a first motor, and a second motor, which are connected to the first through fourth rotational elements, respectively;

an engine clutch interposed between the first rotational element and the engine;

means for modifying a speed ratio, which is a ratio between the rotation speed of the engine and the rotation speed of the output gear, to be continuously variable by controlling the rotation speed of at least one of the first motor, the second motor, and the engine; and means for, when switching from a travel mode in which the vehicle travels with the engine clutch disengaged to a travel mode in which the vehicle travels with the engine clutch engaged, performing a preparatory speed change to reduce a rotation speed differential in the engine clutch, engaging the engine clutch when the rotation speed differential in the engine clutch is reduced, and then performing a completion speed change until the speed ratio required in the post-switching travel mode is obtained, wherein an upper limit value of a shifting speed during at least one of the preparatory speed change and the completion speed change is set to a different value to the upper limit value of the shifting speed when a speed change is performed during traveling in the same travel mode.

8. A hybrid vehicle comprising:

a two freedom-degree differential mechanism having at least first through fifth rotational elements disposed on an alignment chart;

an engine, an output gear which outputs a driving force to a drive wheel, a first motor, a second motor, and a fixed speed ratio brake, which are connected to the first through fifth rotational elements, respectively; and a controller which controls a rotation speed of the engine, the first motor, and the second motor and an engagement of the fixed speed ratio brake, wherein the controller functions to:

modify a speed ratio, which is a ratio between the rotation speed of the engine and the rotation speed of the output gear, to be continuously variable by disengaging the fixed speed ratio brake and controlling the rotation speed of at least one of the first motor, the second motor, and the engine;

fix the speed ratio by engaging the fixed speed ratio brake; and when switching from a travel mode in which the vehicle travels with the fixed speed ratio brake disengaged to a travel mode in which the vehicle travels with the fixed speed ratio brake engaged, perform a preparatory speed change to reduce a rotation speed differential in the fixed speed ratio brake, engage the fixed speed ratio brake when the rotation speed differential in the fixed speed ratio brake is reduced, and then perform a completion speed change until the speed ratio required in the post-switching travel mode is obtained, and an upper limit value of a shifting speed during at least one of the preparatory speed change and the completion speed change is set to a different value to the upper limit value of the shifting speed when a speed change is performed during traveling in the same travel mode.

9. The hybrid vehicle as defined in claim 8, wherein the upper limit value of the shifting speed during the preparatory speed change is set higher than the upper limit value of the shifting speed when a speed change is performed within the same travel mode.

10. The hybrid vehicle as defined in claim 8, wherein the upper limit value of the shifting speed during the completion speed change is set lower than the upper limit value of the shifting speed when a speed change is performed within the same travel mode.

11. The hybrid vehicle as defined in claim 8, wherein, when switching from the travel mode in which the vehicle travels with the fixed speed ratio brake engaged to the travel mode in which the vehicle travels with the fixed speed ratio brake disengaged, the controller further functions to disengage the fixed speed ratio brake and set the upper limit value of the shifting speed lower than the upper limit value of the shifting speed when a speed change is performed within the same travel mode, and then perform a speed change until the speed ratio required in the post-switching travel mode is obtained.

12. The hybrid vehicle as defined in claim 8, wherein the upper limit value of the shifting speed when a speed change is performed within the same travel mode is the upper limit value of the shifting speed when a speed change is performed under a fixed driving force condition in the same travel mode.

13. A control method for a hybrid vehicle including a two freedom-degree differential mechanism having at least first through fifth rotational elements disposed on an alignment chart; and an engine, an output gear which outputs a driving force to a drive wheel, a first motor, a second motor, and a fixed speed ratio brake, which are connected to the first through fifth rotational elements, respectively; the method comprising:

modifying a speed ratio, which is a ratio between the rotation speed of the engine and the rotation speed of the output gear, to be continuously variable by disengaging the fixed speed ratio brake and controlling the rotation speed of at least one of the first motor, the second motor, and the engine;

fixing the speed ratio by engaging the fixed speed ratio brake; and when switching from a travel mode in which the vehicle travels with the fixed speed ratio brake disengaged to a travel mode in which the vehicle travels with the fixed speed ratio brake engaged, performing a preparatory speed change to reduce a rotation speed differential in the fixed speed ratio brake, engaging the fixed speed ratio brake when the rotation speed differential in the fixed speed ratio brake is reduced, and then performing a completion speed change until the speed ratio required in the post-switching travel mode is obtained, wherein an upper limit value of a shifting speed during at least one of the preparatory speed change and the completion speed change is set to a different value to the upper limit value of the shifting speed when a speed change is performed during traveling in the same travel mode.

14. A hybrid vehicle comprising:
a two freedom-degree differential mechanism having at least first through fifth rotational elements disposed on an alignment chart;
an engine, an output gear which outputs a driving force to a drive wheel, a first motor, a second motor, and a fixed speed ratio brake, which are connected to the first through fifth rotational elements, respectively;
means for modifying a speed ratio, which is a ratio between the rotation speed of the engine and the rotation speed of the output gear, to be continuously variable by disengaging the fixed speed ratio brake and controlling the rotation speed of at least one of the first motor, the second motor, and the engine;
means for fixing the speed ratio by engaging the fixed speed ratio brake; and
means for, when switching from a travel mode in which the vehicle travels with the fixed speed ratio brake disengaged to a travel mode in which the vehicle travels with the fixed speed ratio brake engaged, performing a preparatory speed change to reduce a rotation speed differential in the fixed speed ratio brake, engaging the fixed speed ratio brake when the rotation speed differential in the fixed speed ratio brake is reduced, and then performing a completion speed change until the speed ratio required in the post-switching travel mode is obtained,
wherein an upper limit value of a shifting speed during at least one of the preparatory speed change and the completion speed change is set to a different value to the upper limit value of the shifting speed when a speed change is performed during traveling in the same travel mode.

* * * * *